(12) United States Patent
Roeder

(10) Patent No.: US 10,926,881 B2
(45) Date of Patent: Feb. 23, 2021

(54) SEAT ADJUSTMENT SYSTEM AND METHOD

(71) Applicant: THE BOEING COMPANY, Chicago, IL (US)

(72) Inventor: Raymond Roeder, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 34 days.

(21) Appl. No.: 16/367,314

(22) Filed: Mar. 28, 2019

(65) Prior Publication Data

US 2020/0307807 A1    Oct. 1, 2020

(51) Int. Cl.
F16M 13/00 (2006.01)
B64D 11/06 (2006.01)

(52) U.S. Cl.
CPC ...... B64D 11/0696 (2013.01); B64D 11/0639 (2014.12)

(58) Field of Classification Search
CPC ............ B64D 11/0639; B64D 11/0696; B60N 2/01575
See application file for complete search history.

(56) References Cited

U.S. PATENT DOCUMENTS

| | | | | |
|---|---|---|---|---|
| 6,299,230 B1 * | 10/2001 | Oettl | ................. | B60N 2/01558 296/65.03 |
| 7,713,009 B2 | 5/2010 | Hudson | | |
| 7,785,053 B2 | 8/2010 | Hudson | | |
| 8,128,326 B2 | 3/2012 | Hudson | | |
| 8,920,085 B2 * | 12/2014 | Hudson | .............. | B64D 11/0696 410/105 |
| 9,567,086 B2 | 2/2017 | Siegmeth | | |
| 2020/0307806 A1 * | 10/2020 | Wilcynski | .......... | B64D 11/0639 |

OTHER PUBLICATIONS

U.S. Appl. No. 16/365,788, filed Mar. 27, 2019.
U.S. Appl. No. 16/365,777, filed Mar. 27, 2019.
U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/368,934, filed Mar. 29, 2019.
U.S. Appl. No. 16/671,238, filed Nov. 1, 2019.

* cited by examiner

Primary Examiner — Amy J. Sterling
(74) Attorney, Agent, or Firm — The Small Patent Law Group LLC; Joseph M. Butscher

(57) ABSTRACT

A seat adjustment system and method include a seat assembly having at least one securing stud that is configured to be retained within a track channel of a seat track, and a seat adjuster coupled to the seat assembly. The seat adjuster includes at least one glider. The seat adjuster is moveable between a secured position in which the glider(s) is separated from a top surface of the seat track and the securing stud(s) is retained within the track channel of the seat track, and an adjustment position in which the glider(s) is positioned on a top surface of the seat track and the securing stud(s) is outside of the seat track.

20 Claims, 6 Drawing Sheets

SEAT ADJUSTMENT SYSTEM AND METHOD

FIELD OF EMBODIMENTS OF THE DISCLOSURE

Embodiments of the present disclosure generally relate to seat adjustment systems and methods, and more particularly, to seat adjustment systems and methods that allow for efficient adjustment of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

Between flights of an aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section.

In order to change the pitch between rows of seats, the seats of at least one of the rows are completely removed and lifted from seat tracks. The seats are then moved to a new position, where they are secured to the seat tracks. Aircraft mechanics typically use tools to unfasten the seats from the seat tracks, manually handle the seats to remove from the aircraft structural tracks, reposition and align the seats in relation to the new positions, and again use tools to securely lock the seats in the new positions. Moreover, any electrical connections within the seats are typically disconnected before the seats are moved, and then reconnected at the new positions. Further, space within an aircraft is limited, thereby making it awkward and sometimes difficult for mechanics to access certain areas with tools and properly coordinate relocation maneuvers therein.

As can be appreciated, the process of removing the seats from the seat tracks, moving the seats to new positions, and securing the seats at the new positions is time and labor intensive. If there is a relatively short time until a subsequent flight, there may not be sufficient time to adjust the seats to new positions.

SUMMARY OF THE DISCLOSURE

A need exists for an efficient system and method for moving seats within an internal cabin of an aircraft. Further, a need exists for a system and method that allow for quick and efficient adjustment and readjustment of seats within an internal cabin.

With those needs in mind, certain embodiments of the present disclosure provide a seat adjustment system including a seat assembly having at least one securing stud that is configured to be retained within a track channel of a seat track, and a seat adjuster coupled to the seat assembly. The seat adjuster includes at least one glider. The seat adjuster is moveable between a secured position in which the glider(s) is separated from a top surface of the seat track and the securing stud(s) is retained within the track channel of the seat track, and an adjustment position in which the glider(s) is positioned on a top surface of the seat track and the securing stud(s) is outside of the seat track. In at least one embodiment, the securing stud extend(s) downwardly from at least one leg of the seat assembly.

In at least one embodiment, the seat adjuster further includes a lever coupled to the glider(s). The lever is configured to be moved to move the glider(s) between the secured position and the adjustment position. An extension beam may couple the glider(s) to the lever. The lever is pivotally coupled to a portion of the seat assembly by a pivot axle.

In at least one embodiment, a first glider coupled to the seat assembly, and a second glider coupler to the seat assembly. A link may couple the first glider to the second glider.

The glider(s) may include a first rounded end and a second rounded end opposite from the first rounded end. The glider(s) may include a guiding fin that is configured to be slidably retained between opposed retaining arms of the seat track when the seat adjuster is in the adjustment position.

In at least one embodiment, the securing stud(s) is shifted to an expanded opening within the seat track before the seat adjuster is moved to the adjustment position.

Certain embodiments of the present disclosure provide a seat adjustment method that includes providing a seat assembly having at least one securing stud that is configured to be retained within a track channel of a seat track, coupling a seat adjuster having at least one glider to the seat assembly, and moving the seat adjuster between a secured position in which the glider(s) is separated from a top surface of the seat track and the securing stud(s) is retained within the track channel of the seat track, and an adjustment position in which the glider(s) is positioned on a top surface of the seat track and the securing stud(s) is outside of the seat track.

Certain embodiments of the present disclosure provide a vehicle including an internal cabin, a first floor panel within the internal cabin, a second floor panel within the internal cabin, a seat track extending between the first floor panel and the second floor panel, wherein the seat track comprises a track channel, and a seat adjustment system, as described herein.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat adjustment systems and methods that include a seat adjuster, which may include a lever coupled to a glider, which may be formed of and/or coated with low a friction material. The lever is engaged to pivot the glider onto a top of the seat track, which allows a seat assembly to be slidably adjusted over the seat track. The glider allows the seat assembly to be smoothly and easily slid to a desired position.

Instead of a lever, other devices may be used to move the glider onto the top of the seat track. For example, tools may be used to move the glider, instead of lever. In at least one embodiment, a rotary device, such as a drill, may be used to engage the glider.

In at least one embodiment, the lever may move a boss or the like into one of the expanded openings, apply force to the boss, which is moved into a securing stud, and thereby slides the securing stud to another expanded opening (which also moves the seat assembly in response). Continued rotation of the lever may then raise the seat assembly and attached seat securing stud outside the track.

Figure 1:
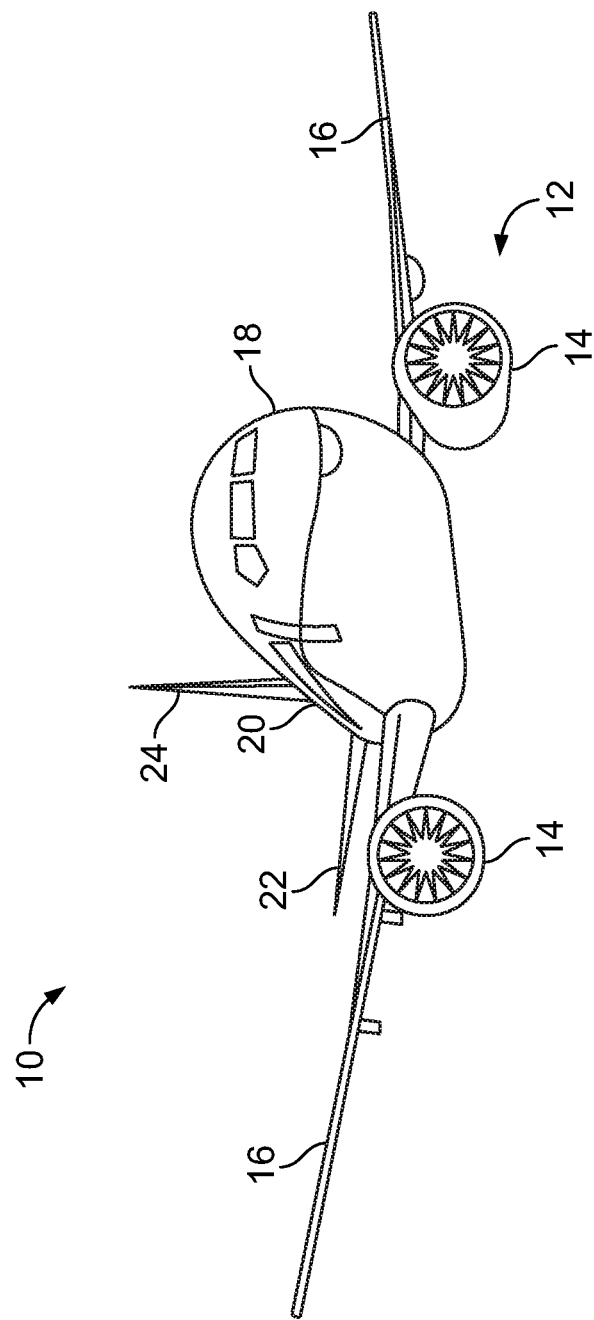
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
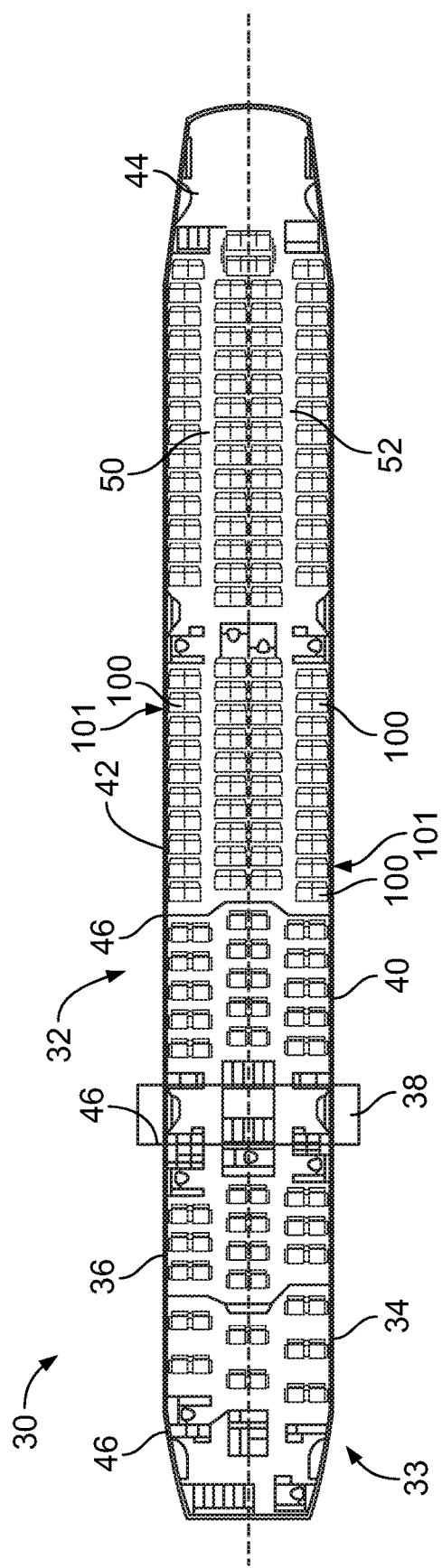
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. The seat assemblies 100 form part of seat adjustment systems, as described herein, that allow spacing or pitch between rows 101 of adjacent seat assemblies 100 to be quickly and efficiently adjusted.

Figure 2B:
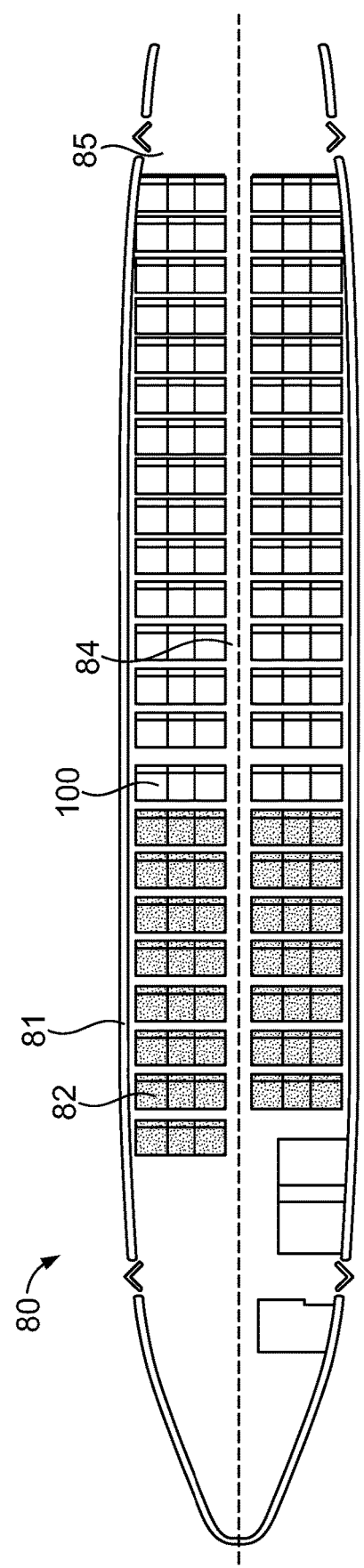
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
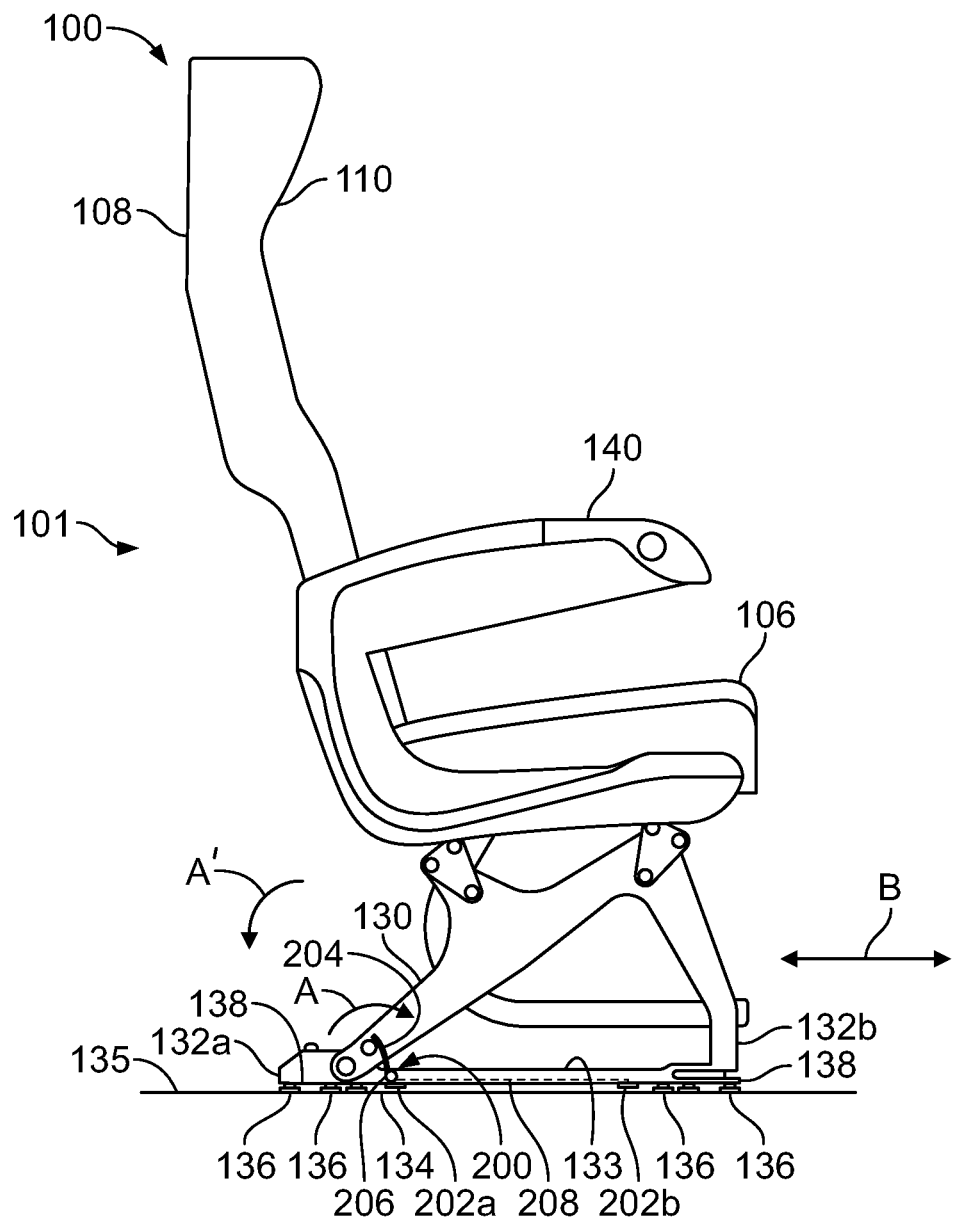
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

A seat adjuster 200 is coupled to the base 130. The seat adjuster 200 includes at least one glider 202a moveably coupled to a lever 204. The lever 204 is coupled to (for example, pivotally coupled to) the base 130, such as via a pivot axle 206. For example, the lever 204 pivotally couples to the spanner bar 133 via the pivot axle 206. Optionally, the lever 204 may pivotally couple to the other portions of the base 130, such as at or proximate to ends of a leg 132.

As shown, the glider 202a is proximate to a rear leg 132a. The glider 202a is coupled to a second glider 202b, which is proximate to a front leg 132b. For example, a link 208, such as a chain, beam, wire, and/or the like, couples the glider 202a to the glider 202b, such that motion of the gliders 202a and 202b is synchronized. In at least one other embodiment, the seat adjuster 200 does not include the second glider 202b or the link 208. Optionally, the gliders 202a and/or 202b may be moveably coupled to the base 130 at different areas than shown. For example, a single glider 202a may be located at or proximate to a central location of the spanner beam 133.

The seat assembly 100 including the seat adjuster 200 moveably coupled to the seat track 134 defines a seat adjustment system 101. In operation, in order to move the seat assembly 100 to a different position, an individual grasps the lever 204 and pivots the lever 204 in the direction of arc A, which forces the gliders 202a and 202b onto a top surface 135 of the seat track 134, thereby causing the securing studs 136 to rise out of the seat track 134. As described herein, the gliders 202a and 202b include guiding fins (not shown in FIG. 3) that move into a track channel 184 (shown in FIG. 4) of the seat track 134 to ensure that the securing studs 136 remain aligned over the track channel 184. The seat assembly 100 may then be moved to a desired position in relation to the seat track 134. At the desired position, the lever 204 is rotated in the direction of arc A', thereby disengaging the gliders 202a and 202b from the seat track 134, and lowering the seat assembly 100 so that the securing studs 136 are lowered into the track channel 184.

In at least one embodiment, the lever 204 may be configured to translate the seat assembly 100 so that the securing studs 136 are shifted to an expanded opening 180, lower the glider(s) 202a and 202b onto the top of the seat track 134, and also lift the securing studs 136 outside of the seat track. For example, the lever 204 may be coupled to one or more cam(s), pawl(s), and/or the like that provide such movements.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

Each leg 132 of the seat assembly 100 may include a seat adjuster 200. Optionally, less than each leg 132 may include a seat adjuster 200. For example, only one leg 132 on each side of the seat assembly 100 may include a seat adjuster 200. In at least one other embodiment, only one leg 132 of the seat assembly 100 may include a seat adjuster 200.

Figure 4:
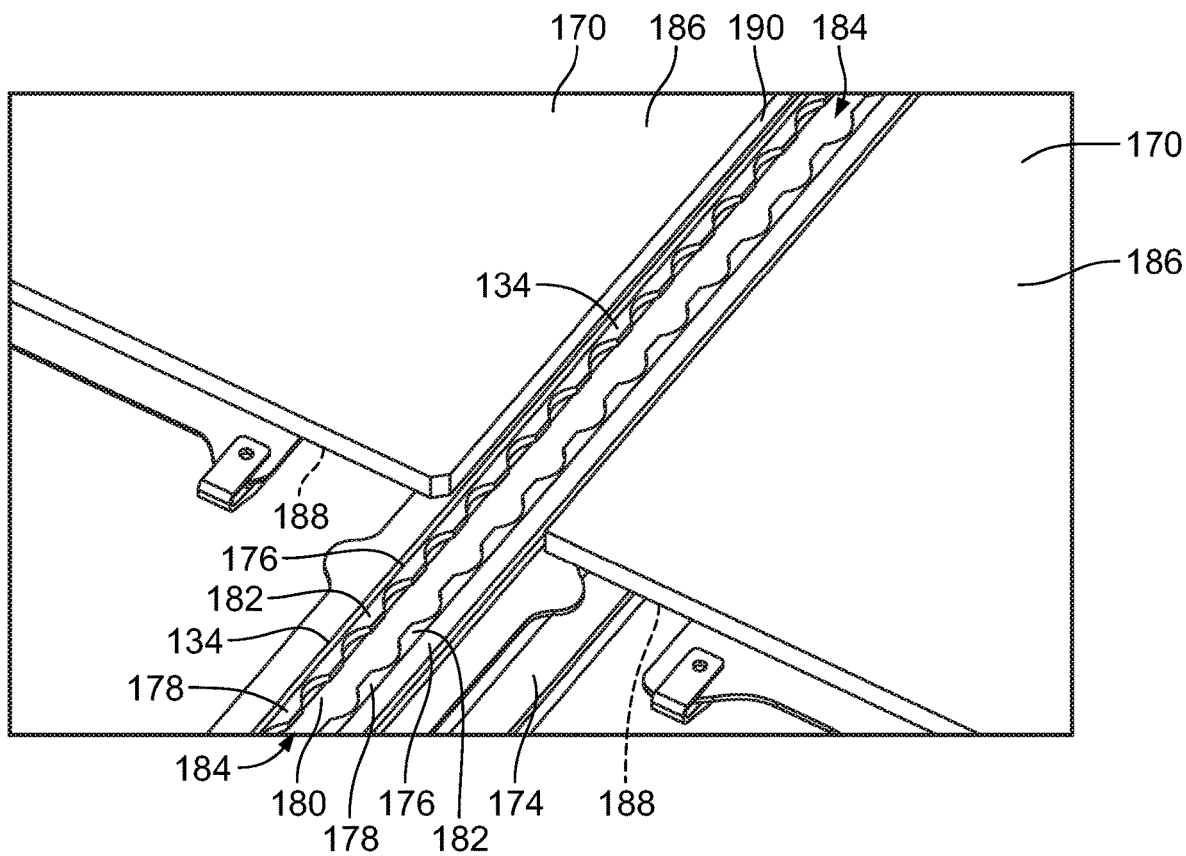
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Figure 5:
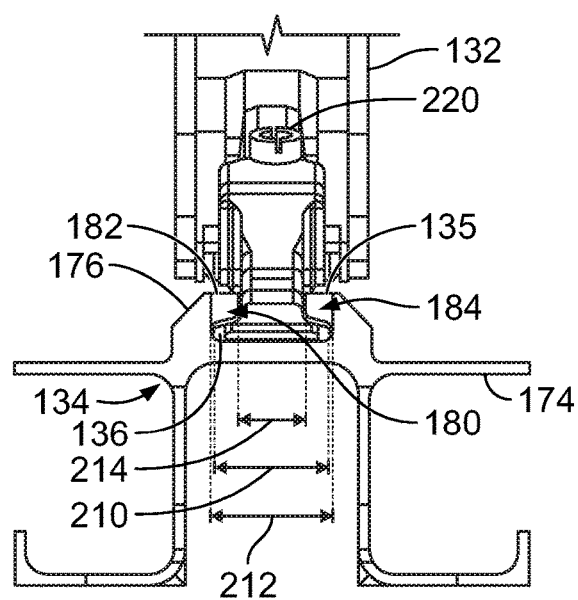
FIG. 5 illustrates an end view of a securing stud within a track channel of a seat track, according to an embodiment of the present disclosure.

FIG. 5 illustrates an end view of a securing stud 136 within a track channel 184 of a seat track 134, according to an embodiment of the present disclosure. Referring to FIGS. 3-5, the securing studs 136 of the seat assembly 100 may have a circular cross section and a width 210 that is less than a width 212 of the expanded openings 180. The width 210 is greater than a width 214 of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting 220 (such as a bolt or other such fastener) is manipulated to unlock the legs 132. For example, the lock fitting 220 may be loosened such that a distal end no longer engages a portion of the seat track 134. Optionally, the seat assembly 100 may not include lock fittings.

After the lock fitting 220 disengages from the seat track 134, the seat assembly 100 may be longitudinally shifted in relation to the seat track 134 in the directions of arrows B. The seat assembly 100 is shifted in the direction of arrows B so that the securing studs 136 are no longer underneath the retaining arms 182, but are instead within the expanded openings 180. After the securing studs 136 are in the expanded openings 180, the seat adjuster 200 may be moved from a secured position, in which the securing studs 136 are in the track channel 184 to an adjustment position, in which the securing studs 136 are raised out of the track channel 184.

Figure 6:
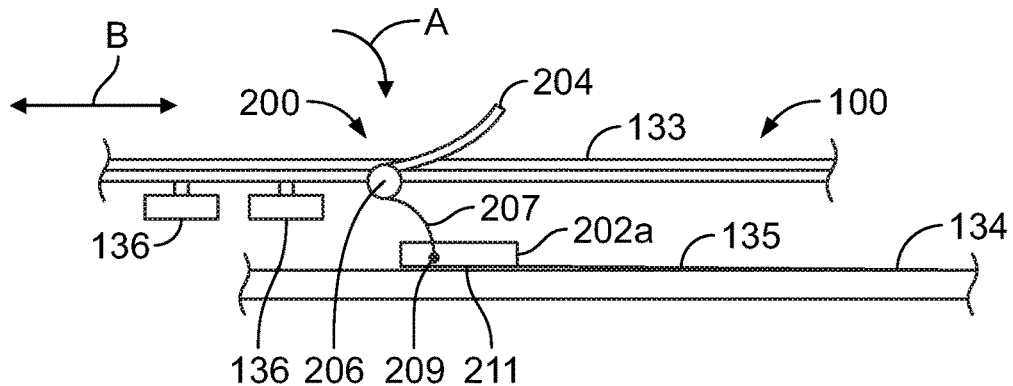
FIG. 6 illustrates a lateral view of a portion of the seat assembly with a seat adjuster in an adjustment position, according to an embodiment of the present disclosure.

In particular, as the lever 204 is pivoted in the direction of arc A (as shown in FIGS. 3 and 6), the gliders 202a and 202b are forced onto a top surface 135 of the seat track 134, thereby causing the securing studs 136 to rise out through the expanded openings 180 of the seat track 134. At the same time, the guiding fins of the gliders 202a and 202b are moved into the track channel 184 (shown in FIGS. 4 and 8) of the seat track 134 thereby ensuring that the securing studs 136 remain aligned over the track channel 184. The seat assembly 100 may then be moved to a desired position in relation to the seat track 134. At the desired position, as the lever 204 is rotated in the direction of arc A', the gliders 202a and 202b separate from the seat track 134, and the seat assembly 100 is lowered so that the securing studs 136 are lowered into expanded openings 180 of the track channel 184.

FIG. 6 illustrates a lateral view of a portion of the seat assembly 100 with the seat adjuster 200 in an adjustment position, according to an embodiment of the present disclosure. As shown, the lever 204 has been pivoted to move the glider 202a onto the top surface 135 of the seat track 134. In at least one embodiment, the seat adjuster 200 includes an extension beam 207 coupled to the pivot axle 206. The extension beam 207 couples the glider 202a to the lever 204 via the pivot axle 206. As the lever 204 is pivoted in the direction of arc A. the extension beam 207 ensures that the glider 202a separates the securing studs 136 from the seat track 134.

In at least one embodiment, the glider 202a is pivotally coupled to the extension beam 207 through a pivot axle 209. As such, when the glider 202a is forced onto the top surface 135 of the seat track 134, a bottom surface 211 of the glider 202a provides a flat and consistent interface with the top surface 135 of the seat track 134. Any other gliders of the seat adjuster 200 (such as the glider 202b) may be configured similar to the seat adjuster 202a shown in FIG. 6.

Referring to FIGS. 3-6, after the seat adjuster 200 is in the adjustment position, in which the gliders 202a and 202b are on the top surfaces 135 of the seat track 134 and the securing studs 136 are lifted above the seat track 134 (as shown in FIG. 6), the seat assembly 100 may be longitudinally moved (such as by being slid) in the directions of arrow B.

Figure 7:
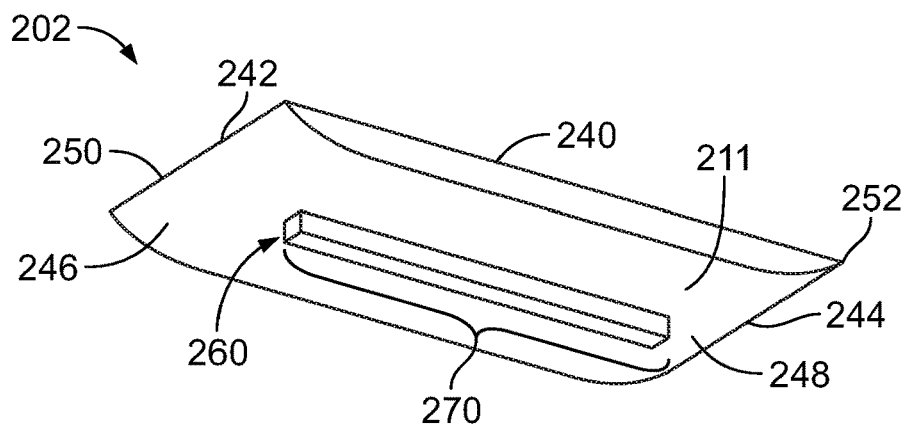
FIG. 7 illustrates a perspective bottom view of a glider, according to an embodiment of the present disclosure.
Figure 8:
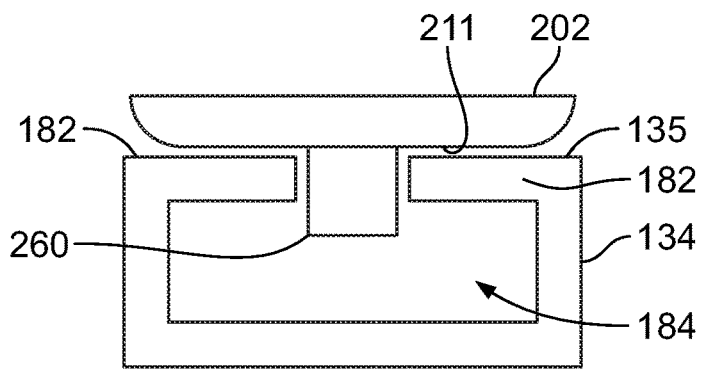
FIG. 8 illustrates an end view of the glider engaging the seat track, according to an embodiment of the present disclosure.

FIG. 7 illustrates a perspective bottom view of a glider 202, according to an embodiment of the present disclosure. FIG. 8 illustrates an end view of the glider 202 engaging the seat track 134. Referring to FIGS. 7 and 8, the glider 202 may be formed of a low friction material to ensure smooth sliding over the seat track 134. For example, the glider 202 may be formed of a low friction plastic, or a metal that is coated with a low friction coating. In at least one embodiment, the gliders 202a and 202b shown in FIGS. 3 and 6 are configured as the glider 202.

The glider 202 includes a main body 240 having an upwardly turned first end 242 and an upwardly turned second end 244. Each of the upwardly turned first end 242 and the upwardly turned second end 244 includes a rounded surface 246 and 248, respectively, that curves upwardly from the bottom surface 211 towards a distal top edge 250 and 252, respectively. The rounded surfaces 246 and 248 ensure smooth movement over the seat track 134 (shown in FIGS. 3-6) and eliminate, minimize, or otherwise reduce the potential of the glider 202 snagging on a portion of the seat track 134. Alternatively, the glider 202 may not include the rounded surfaces.

A guiding fin 260 downwardly extends from the bottom surface 211. Referring to FIGS. 3-7, when the seat adjuster 200 is in the seat adjustment position, the guiding fin 260 is slidably retained between the opposed retaining arms 182 of the seat track 134 to ensure proper alignment of the securing studs 136 in relation to the track channel 184. The guiding fin 260 is a longitudinal panel having a width that allows it to fit between the retaining arms 182. In at least one embodiment, the guiding fin 260 has a length 270 that exceeds a length of any of the expanded openings 180 to ensure that the guiding fin 260 engages at least one set of opposed retaining arms 182 when the seat adjuster 200 is in the seat adjustment position.

Figure 9:
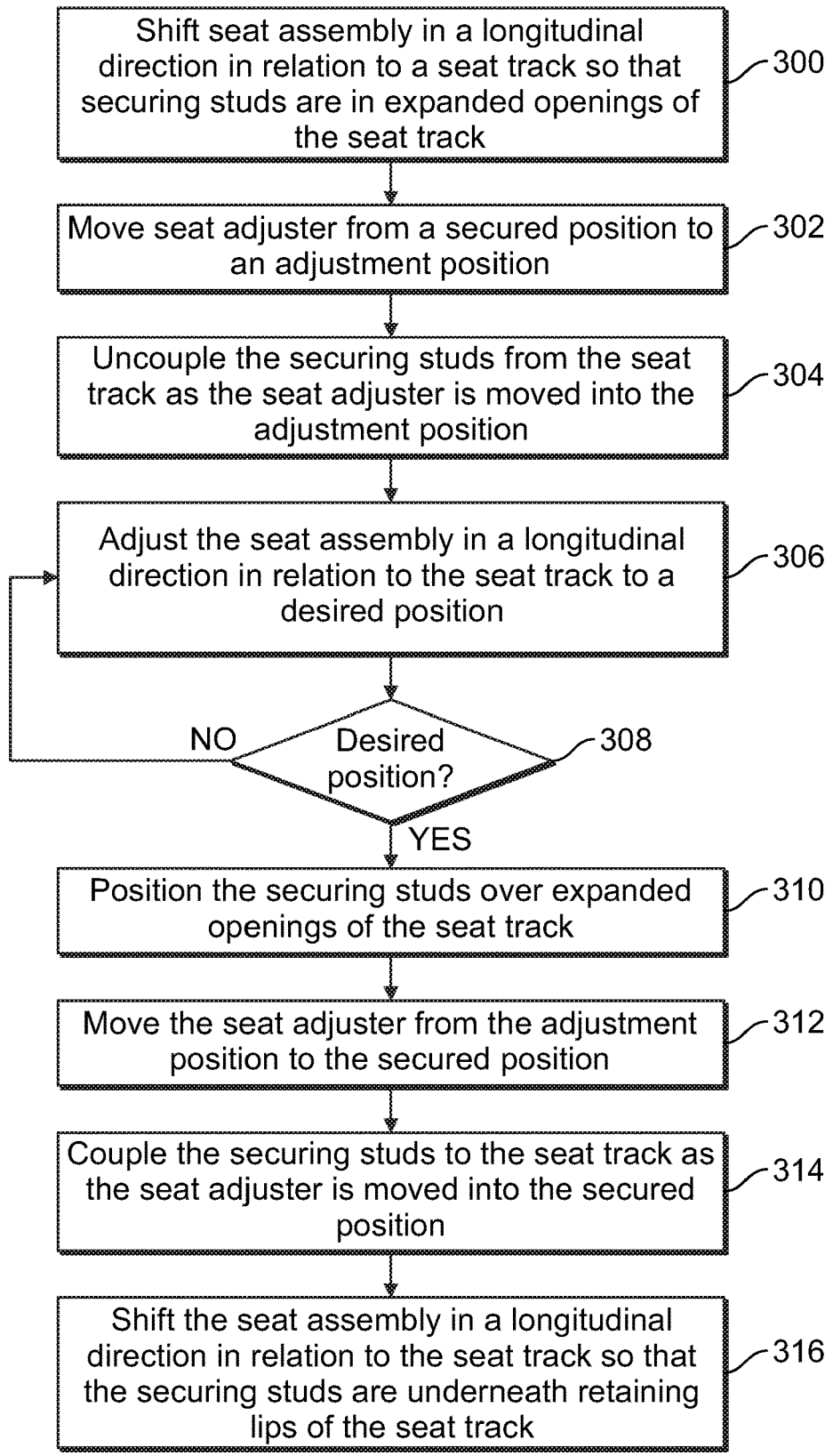
FIG. 9 illustrates a flow chart of a seat adjustment method, according to an embodiment of the present disclosure.

FIG. 9 illustrates a flow chart of a seat adjustment method, according to an embodiment of the present disclosure. Referring to FIGS. 3-9, at 300, the seat assembly 100 is shifted in a longitudinal direction in relation to the seat track 134 so that the securing studs 136 are in expanded openings 180 of the seat track 134. At 302, the seat adjuster 150 is moved from the secured position to the adjustment position, such that the gliders 202a and 202b engage the top surfaces 135 of the seat tracks 134 and the securing studs 136 are raised out of the track channels 184. At 304, the securing studs 136 uncouple from the seat track 134 as the seat adjuster 200 is moved into the adjustment position.

At 306, the seat assembly 100 is adjusted in a longitudinal direction in relation to the seat track 134 to a desired position by sliding the seat assembly 100 via the gliders 202a and 202b of the seat adjuster 200 over the seat track 134 At 308, it is determined if the seat assembly 100 is in a desired position. If not, the method returns to the 306.

If, however, the seat assembly 100 is at the desired position, the method proceeds from 308 to 310, at which the securing studs 136 of the legs 132 are positioned over expanded openings 180 of the seat track 134. Then, at 312, the seat adjuster 200 is moved from the adjustment position to the secured position, thereby disengaging the gliders 202a and 202b from the seat track 134, and lowering the securing studs 136 into the track channel 184. At 314, the securing studs 136 are coupled to the seat track 134 as the seat adjuster 200 is moved into the secured position. At 316, the seat assembly 100 may then be shifted in a longitudinal direction in relation to the seat track 134 so that the securing studs 136 are trapped underneath the retaining arms 182 of the seat track 134.

In at least one other embodiment, after the lock fitting 220 (shown in FIG. 5) disengages from the seat track 134, operation of the seat adjuster 200 from the secured position to the adjustment position may incorporate mechanical movement to achieve steps 300 thru 304. Such movement may include mechanized longitudinal movement to align the securing studs 136 to the expanded openings 180, forcing gliders 202a and 202b onto a top surface 135 of the seat track 134, thereby causing the uncoupling of the securing studs 136 outside of the seat track 134. Once in desired position, such a mechanized movement may reverse the above to correctly position the securing studs 136 directly under a retaining arm 182 within the seat track 134, ready for the lock fitting 200 to be engaged.

As described herein, certain embodiments of the present disclosure provide a seat adjustment method that includes coupling a seat adjuster 200 to a seat assembly 100 having at least one securing stud 136 that is configured to be retained by a seat track 134. The method includes moving the seat adjuster 200 between a secured position in which the securing stud(s) 136 is retained within the track channel 184 of the seat track 134, and an adjustment position in which the securing stud(s) 136 is outside of the seat track 134.

As explained herein, embodiments of the present disclosure provide efficient systems and methods for moving seats within an internal cabin of an aircraft. Further, embodiments of the present disclosure provide systems and methods that allow for quick and efficient adjustment of seats within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat adjustment system, comprising:
   a seat assembly having at least one securing stud that is configured to be retained within a track channel of a seat track; and
   a seat adjuster coupled to the seat assembly, the seat adjuster comprising at least one glider,
   wherein the seat adjuster is moveable between a secured position in which the at least one glider is separated from a top surface of the seat track and the at least one securing stud is retained within the track channel of the seat track, and an adjustment position in which the at least one glider is positioned on a top surface of the seat track and the at least one securing stud is outside of the seat track.

2. The seat adjustment system of claim 1, wherein the at least one securing stud extends downwardly from at least one leg of the seat assembly.

3. The seat adjustment system of claim 1, wherein the seat adjuster further comprises a lever coupled to the at least one glider, wherein the lever is configured to be moved to move the at least one glider between the secured position and the adjustment position.

4. The seat adjustment system of claim 3, wherein the seat adjuster further comprises an extension beam that couples the at least one glider to the lever.

5. The seat adjustment system of claim 3, wherein the lever is pivotally coupled to a portion of the seat assembly by a pivot axle.

6. The seat adjustment system of claim 1, wherein the at least one glider comprises:
   a first glider coupled to the seat assembly; and
   a second glider coupler to the seat assembly.

7. The seat adjustment system of claim 6, further comprising a link that couples the first glider to the second glider.

8. The seat adjustment system of claim 1, wherein the at least one glider comprises a first rounded end and a second rounded end opposite from the first rounded end.

9. The seat adjustment system of claim 1, wherein the at least one glider comprises a guiding fin that is configured to be slidably retained between opposed retaining arms of the seat track when the seat adjuster is in the adjustment position.

10. The seat adjustment system of claim 1, wherein the at least one securing stud is shifted to an expanded opening within the seat track before the seat adjuster is moved to the adjustment position.

11. A seat adjustment method, comprising:
    providing a seat assembly having at least one securing stud that is configured to be retained within a track channel of a seat track;
    coupling a seat adjuster having at least one glider to the seat assembly; and
    moving the seat adjuster between a secured position in which the at least one glider is separated from a top surface of the seat track and the at least one securing stud is retained within the track channel of the seat track, and an adjustment position in which the at least one glider is positioned on a top surface of the seat track and the at least one securing stud is outside of the seat track.

12. The seat adjustment method of claim 11, wherein the at least one securing stud extends downwardly from at least one leg of the seat assembly.

13. The seat adjustment method of claim 11, further comprising coupling a lever coupled to the at least one glider, wherein the moving comprises moving the lever to move the at least one glider between the secured position and the adjustment position.

14. The seat adjustment method of claim 13, further comprising coupling the at least one glider to the lever by an extension beam.

15. The seat adjustment method of claim 13, further comprising pivotally coupling the lever to a portion of the seat assembly by a pivot axle.

16. The seat adjustment method of claim 11, wherein the at least one glider comprises:
    a first glider coupled to the seat assembly; and
    a second glider coupler to the seat assembly.

17. The seat adjustment method of claim 16, further comprising coupling the first glider to the second glider by a link.

18. The seat adjustment method of claim 11, further comprising providing the at least one glider with a first rounded end and a second rounded end opposite from the first rounded end.

19. The seat adjustment method of claim 11, further comprising retaining a guiding fin of the at least one glider between opposed retaining arms of the seat track when the seat adjuster is in the adjustment position.

20. A vehicle comprising:
    an internal cabin;
    a first floor panel within the internal cabin;
    a second floor panel within the internal cabin;

a seat track extending between the first floor panel and the second floor panel, wherein the seat track comprises a track channel; and a seat adjustment system, comprising:
- a seat assembly having at least one securing stud that is configured to be retained within the track channel of the seat track; and
- a seat adjuster coupled to the seat assembly, the seat adjuster comprising at least one glider, a lever coupled to the at least one glider, a first rounded end and a second rounded end opposite from the first rounded end, and a guiding fin,
- wherein the seat adjuster is moveable between a secured position in which the at least one glider is separated from a top surface of the seat track and the at least one securing stud is retained within the track channel of the seat track, and an adjustment position in which the at least one glider is positioned on a top surface of the seat track and the at least one securing stud is outside of the seat track,
- wherein the lever is configured to be moved to move the at least one glider between the secured position and the adjustment position,
- wherein the guiding fin that is configured to be slidably retained between opposed retaining arms of the seat track when the seat adjuster is in the adjustment position.

* * * * *